United States Patent [19]
Ohta

[11] Patent Number: 5,954,015
[45] Date of Patent: Sep. 21, 1999

[54] DISPOSABLE DIAPER FOR ANIMALS AND METHOD OF MANUFACTURE

[75] Inventor: Shigefumi Ohta, Mino, Japan

[73] Assignee: Ohta Eizai Co., Ltd., Japan

[21] Appl. No.: 08/923,751

[22] Filed: Sep. 2, 1997

[30] Foreign Application Priority Data

Jun. 2, 1997 [JP] Japan .................................. 9-144009

[51] Int. Cl.⁶ .................................................. A01K 13/00
[52] U.S. Cl. ............................................................. 119/850
[58] Field of Search .................................. 119/850, 868; 54/79.1, 79.4

[56] References Cited

U.S. PATENT DOCUMENTS 3,211,132  10/1965  Hersh .................................. 119/850 X
5,146,874   9/1992  Vidal .................................... 119/868
5,555,847   9/1996  Kelly ................................... 119/850

*Primary Examiner*—Robert P. Swiatek
*Attorney, Agent, or Firm*—Quarles & Brady

[57] ABSTRACT

A diaper for animals includes an inner permeable sheet, an outer water-proof sheet, an absorbent material located between the permeable sheet and the water-proof sheet and a tail area defined by a line of weakness in the water-proof sheet. The tail area is located at a place on the diaper that corresponds to the location of an animal's tail when the diaper is worn by an animal. A hole may be manually formed in the water-proof sheet for accommodating the tail of an animal by manually separating the water-proof sheet along the line of weakness.

17 Claims, 7 Drawing Sheets

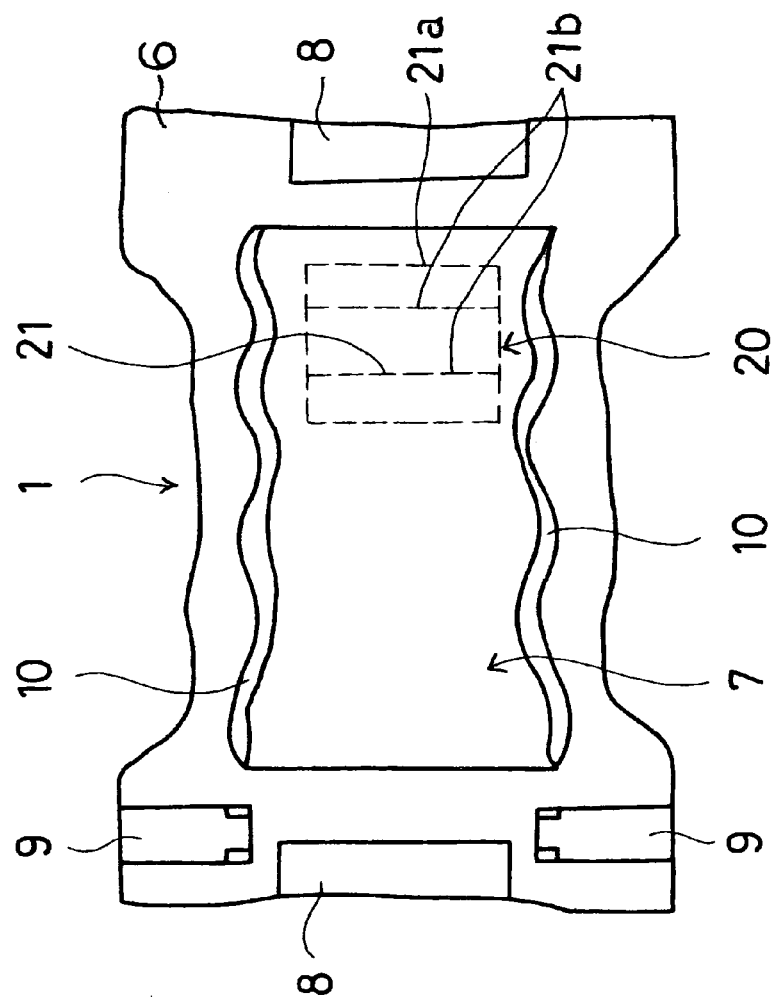
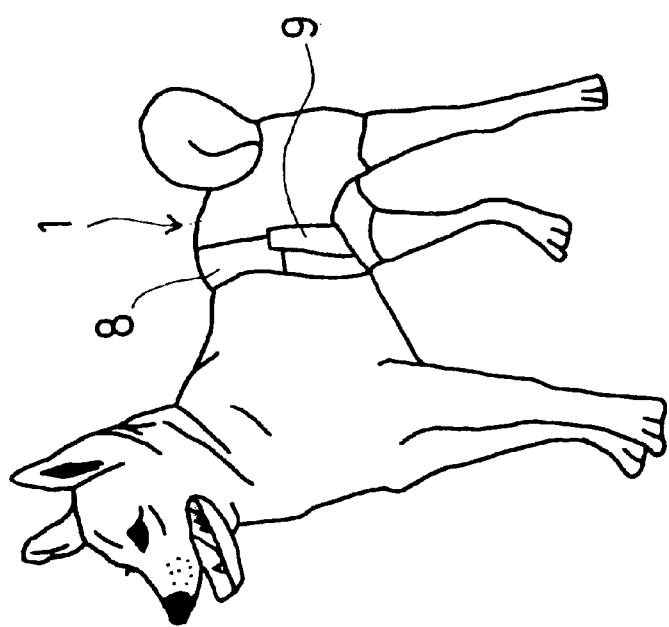

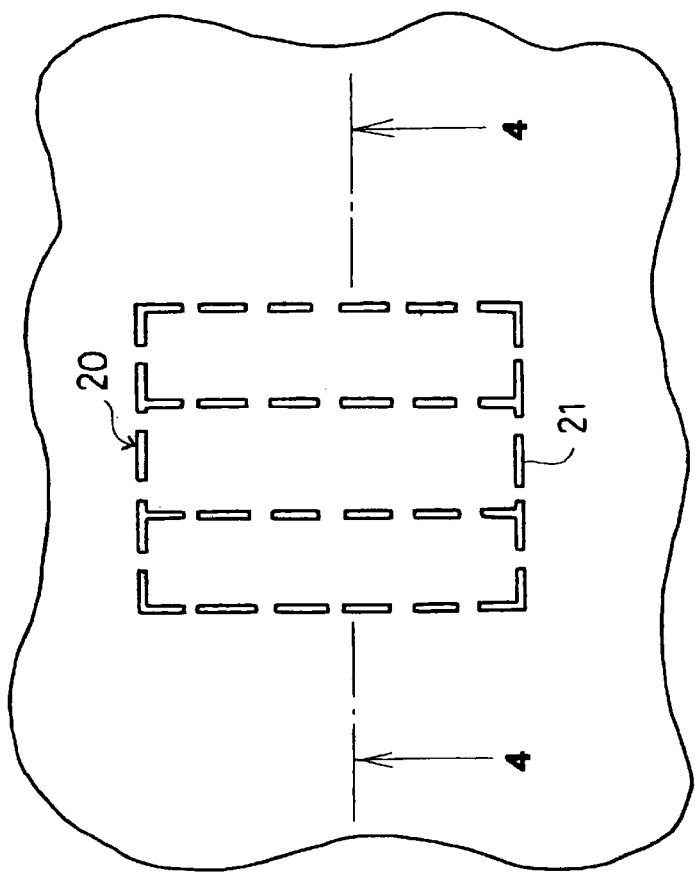
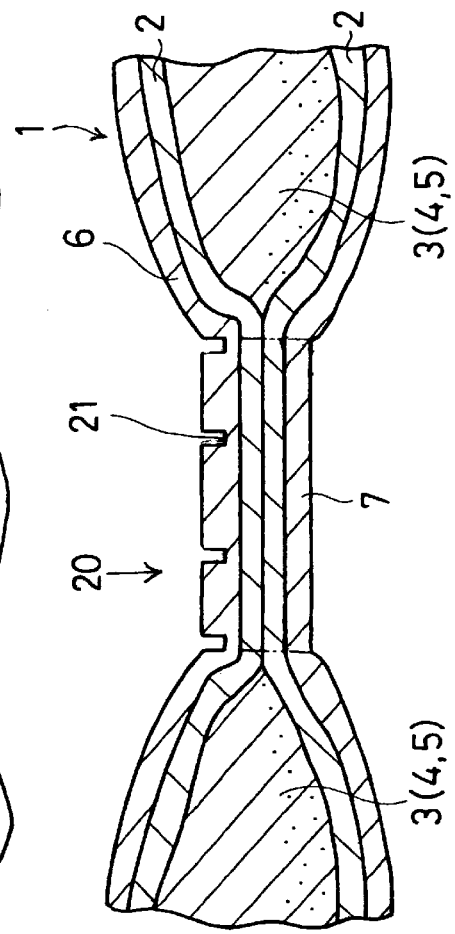
Fig. 3
Fig. 4

5,954,015

DISPOSABLE DIAPER FOR ANIMALS AND METHOD OF MANUFACTURE

BACKGROUND OF THE INVENTION

1. Field of the Invention

The present invention relates to disposable diapers for animals, such as pets.

2. Description of the Related Art

A typical disposable diaper for animals includes an inner permeable sheet made of non woven fabric, an outer waterproof sheet made of synthetic resin and absorbent located between the inner and outer sheets.

The diaper has a hole having predetermined size and shape at a location corresponding to the tail of the animal for allowing the animal's tail to pass through. At the peripheral part of the hole, the opening between the outer and inner sheets is closed by, for example, adhesive tape so that the absorbent does not come out of the hole.

As described above, the hole of the prior art diaper has predetermined shape and size. Therefore, when applied to an animal having a large tail, the tail cannot pass through the tail hole. Further, the fixed shape and size of the hole has the drawbacks described below.

Diapers for animals are generally used in two ways. One is to receive both solid and fluid body waste of an animal. The other is to receive only fluid waste of the animal.

When a diaper is used to receive both solid and fluid waste, the prior art diaper cannot be applied on an animal having no tail. This is because the tail hole is very likely to allow solid waste to escape and may permit fluid waste to leak out. Further, when the prior art diaper is applied on an animal having a small tail, the clearance between the tail and the hole tends to be too large. This causes the same problem as the case of animals having no tail. That is, the clearance may allow solid and fluid waste to escape.

The prior art diaper also has drawbacks when used for receiving only fluid waste of animals. If the diaper is applied on an animal having a large tail, it is difficult for the tail to pass through the hole. Even if the tail passes through the hole, there is little clearance between the tail and the periphery of the hole. This prevents the animal from excreting solid waste to the outside.

In addition, as described above, adhesive tape needs to be applied to the periphery of the hole to hold the absorbent between the inner and outer sheets. This complicates the manufacturing of the diaper thereby rasing the manufacturing cost.

SUMMARY OF THE INVENTION

Accordingly, it is an objective of the present invention to provide an improved diaper for animals that reduces the manufacturing cost.

To achieve the foregoing and other objectives and in accordance with the purpose o the present invention, an improved diaper for animals is disclosed. The diaper includes an inner permeable sheet, an outer water-proof sheet, an absorbent material located between the permeable sheet and the water-proof sheet and a tail area defined by a line of weakness in the water-proof sheet. The tail area is located at a place on the diaper that corresponds to the location of an animal's tail when the diaper is worn by an animal. A hole may be manually formed in the water-proof sheet for accommodating the tail of an animal by manually separating the water-proof sheet along the line of weakness.

The present invention also discloses a method for manufacturing the above diaper. The method includes the steps of masking an area of one of the sheets such that the masked area includes an area corresponding to the tail area, distributing a layer of absorbent onto the masked sheet over the mask, removing the mask, placing the other of the sheets on the absorbent to sandwich the absorbent between the waterproof sheet and the permeable sheet, and sealing the waterproof sheet to the permeable sheet at the periphery of the diaper and around the tail area.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

FIG. 1 is a perspective view of a dog wearing a diaper according to a first embodiment of the present invention;

FIG. 2 is a plan view of the diaper of FIG. 1;

FIG. 3 is a bottom view illustrating a perforated part of the diaper of FIG. 1;

FIG. 4 is a cross-sectional view taken along line 4—4 of FIG. 3;

DETAILED DESCRIPTION OF THE PREFERRED EMBODIMENTS

Figure 5:
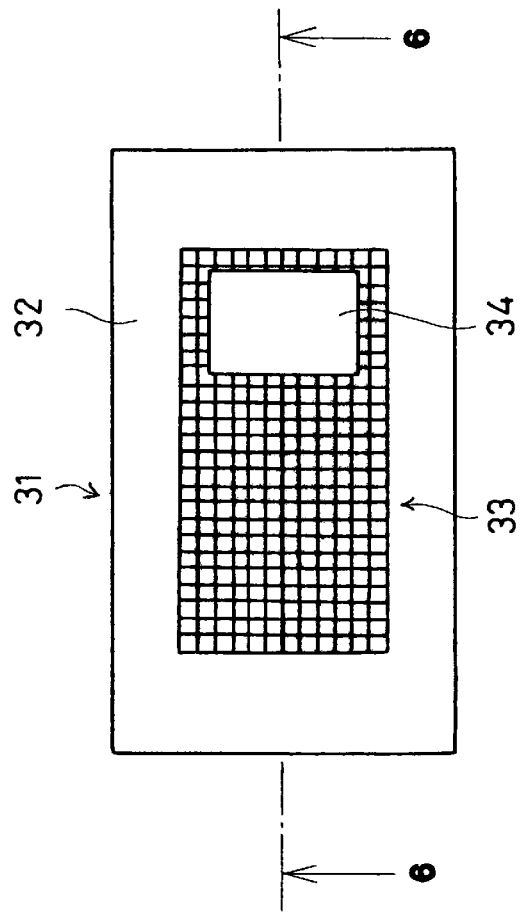
FIG. 5 is a plan view illustrating a masking-frame used for fabricating paper diapers.

A diaper 1 according to a first embodiment of the present invention will hereafter be described with reference to FIGS. 1 to 7.

FIG. 2 shows the inner side of the diaper 1. The inner side contacts the body of an animal when in use. The diaper 1 includes an outer water proof sheet 6 and an inner permeable sheet 7, which is arranged on the inner side of the outer sheet 6. As shown in FIG. 4, absorbent 3 is sandwiched between the sheets 6 and 7. Sheets of absorbent paper 2 are placed between the absorbent 3 and the sheets 6, 7. The periphery of the inner sheet 7 is adhered to the outer sheet 6 for sealing the absorbent 3. A belt 8 is provided extending in the center part of both ends of the diaper 1. Pieces of adhesive tape 9 are provided on both sides of an end of the diaper 1. As shown in FIG. 1, the tapes 9 are used to hold the diaper 1 when it is worn by an animal (for example, a dog). The diaper 1 is gathered on both sides of the permeable sheet 7 for preventing waste of the animal from escaping. Further, the diaper 1 has a non-absorbent tail area 20. As shown in FIG. 4, the tail area 20 includes no absorbent 3. The location of the portion 20 corresponds to the tail of the animal when in use. The absorbent 3 includes pulp 4 and absorbent polymer 5, which is located close to the permeable sheet 7.

In the non-absorbent tail area 20, the sheet 6 is adhered to the permeable sheet 7 by a heat sealing, or melting, process. As shown in FIGS. 3 and 4, lines of weakness, or grooves 21, are formed in the tail area 20. The grooves 21 facilitate removal of a part or parts of the tail area 20 for forming a hole in the diaper 1. The tail of an animal passes through the hole when the diaper 1 is in use. As shown in FIG. 4, the grooves 21 divide the tail area 20 into a plurality of areas (three in this embodiment). For better understanding of the structure of the non-absorbent portion 20, the thickness of the sheets of paper 2 is extremely exaggerated in the drawings, and the grooves 21 are illustrated to be relatively shallow compared to the entire thickness of the tail area 20 in the drawings. In reality, the grooves 21 are formed deep enough to allow a part of the tail area 20 to be easily removed along the grooves 21. Further, the grooves 21, which are not perforated, prevent waste of the animal from escaping therethrough.

As shown in FIG. 4, the sealed area of the sheets 6, 7 is slightly wider than the area encompassed by the grooves 21. Thus, even if the portion 20 is entirely removed along the outer groove 21, the seal around the periphery of the formed seals the absorbent 3 between the sheets 6 and 7.

Figure 6:
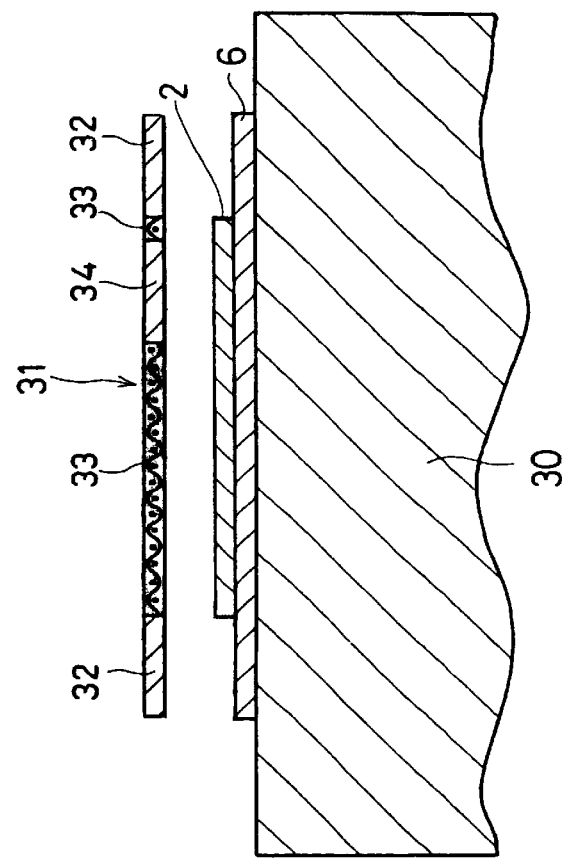
FIG. 6 is a cross-sectional view taken along line 6—6 of FIG. 5.

The assembly of the diaper 1 will now be explained referring to the drawings. As shown in FIG. 6, the waterproof sheet 6 is placed on a table 30. Then, one of the absorbent paper sheets 2 is placed on the sheet 6. A masking plate 31 is held above the sheet 6 and the paper 2. As shown in FIG. 5, the plate 31 includes a frame 32, a mesh 33 and a mask 34. As shown in FIG. 6, the location of the mask 34 corresponds to the portion 20. The pulp 4 is sprayed from above the plate 31 onto the paper sheet 2. Thereafter, the polymer 5 is sprayed on the pulp 4. The pulp 4 and the polymer 5 form the absorbent 3. In this manner, the absorbent 3 is applied on the paper sheet 2 except for the parts covered by the frame 32 and the mask 34 of the plate 31. The covered parts correspond to the peripheral portion of the diaper 1 and the non-absorbent tail area 20.

The other absorbent paper sheet 2 and the permeable sheet 7 are placed on the absorbent 3 and the non-absorbent tail area 20. The periphery of the sheet 7 is then adhered to the waterproof sheet 6, preferably by heat sealing.

Figure 7:
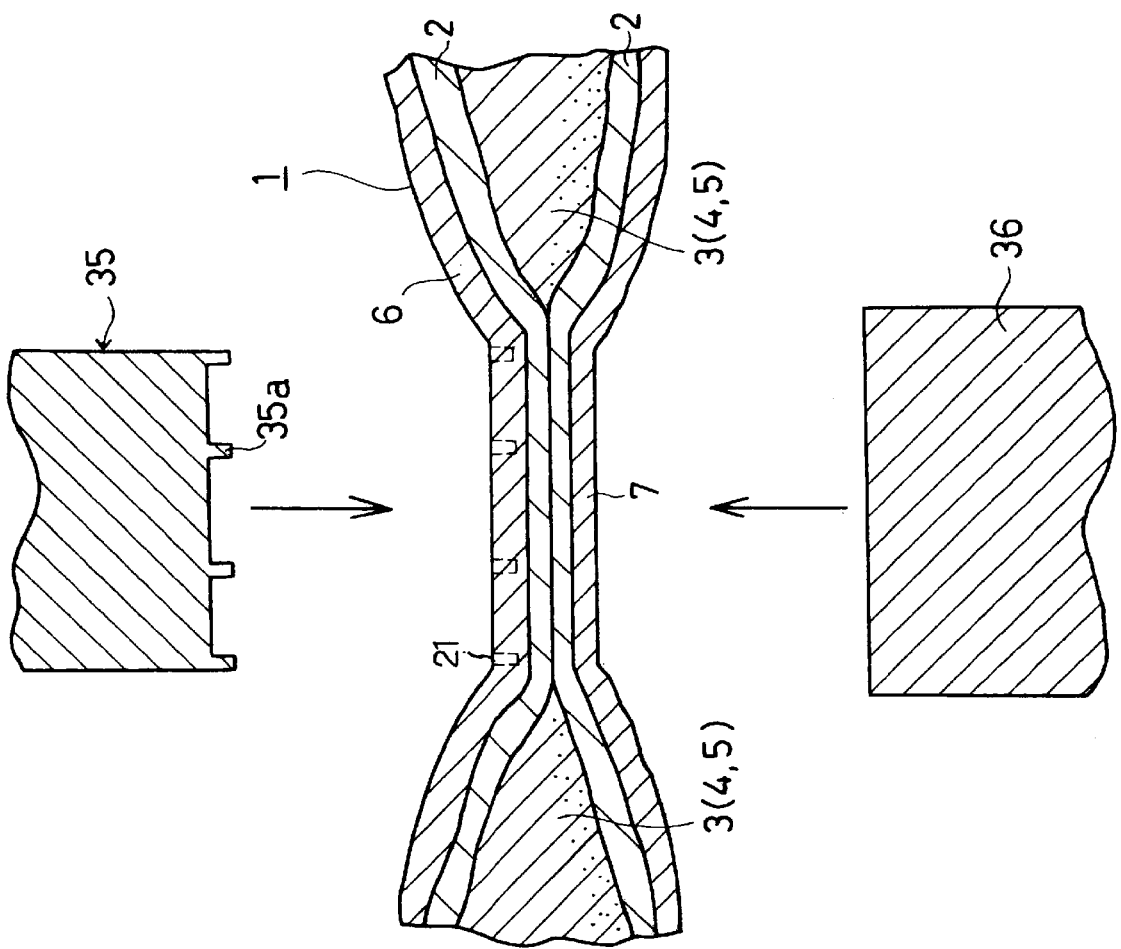
FIG. 7 a cross-sectional view illustrating a procedure for forming a diaper.

As shown in FIG. 7, the non-absorbent tail area 20 is placed on a table 36. Then, a heated press 35 having a plurality of teeth 35a is applied to the tail area 20. The heated press 35 heats and presses the tail area 20 against the table 30. This adheres the part of the sheet 6 in the tail area 20 to the corresponding part of the sheet 7 by heat sealing, or melting. At this time, the teeth 35a form grooves 21.

When the diaper 1 is applied on an animal, part of the tail area 20 is detached to make a hole for accommodating the tail of the animal. At this time, the shape and size of the hole may be varied by removing selected parts that are defined by the grooves 21 in accordance with the size and shape of the tail.

When the diaper 1 is used for receiving both solid and fluid waste of an animal, there is no need to remove any part of the tail area 20 for an animal having no tail.

When the diaper 1 is applied on an animal having a large tail, removing the entire tail area 20 allows the diaper 1 to receive only fluid waste of the animal. That is, the clearance between the base of the tail and the formed hole permits the animal to excrete solid waste therethrough.

Advantages of the first embodiment are as follows.

The diaper 1 includes the weakness grooves 21 along which variably sized holes may be formed. A hole for a tail can be optionally formed if the animal has a tail. Therefore, the diaper 1 can be used on animals having no tail for receiving both solid and fluid waste.

Part of the tail area 20 is removed along the weakness grooves 21. This allows a user to easily form a hole manually.

The adhered part of the sheets 6, 7 is larger than the tail area 20. Thus, even if the entire portion 20 is removed, the absorbent 3 is sealed between the sheets 6, 7. This eliminates the necessity for adhesive tapes to seal around the tail opening.

The size, shape and location of the hole are selected by removing selected parts of the tail area 20 according to the size, shape and position of the tail of the animal. This eliminates undesirable clearance between the tail and the hole.

Figure 9:
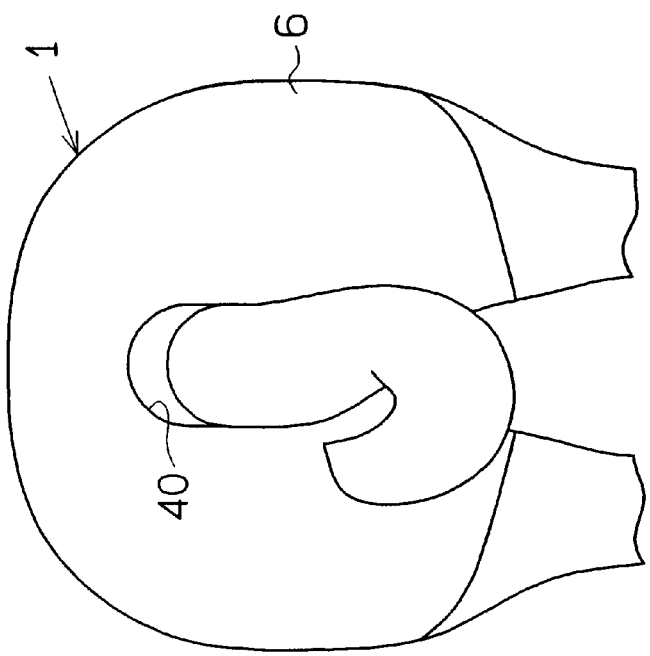
FIG. 9 is a rear view illustrating a dog wearing the diaper of FIG. 8.
Figure 10:
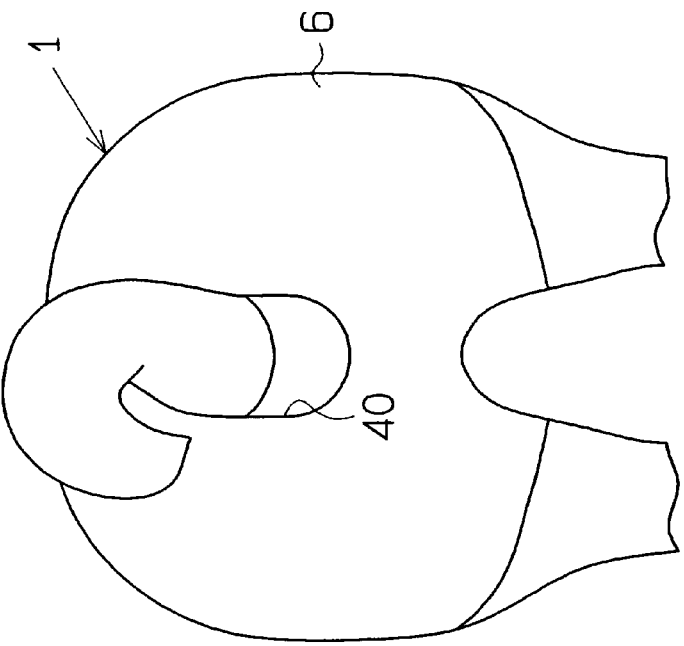
FIG. 10 is a rear view illustrating a dog wearing the diaper of FIG. 8 with the tail elevated.
Figure 15:
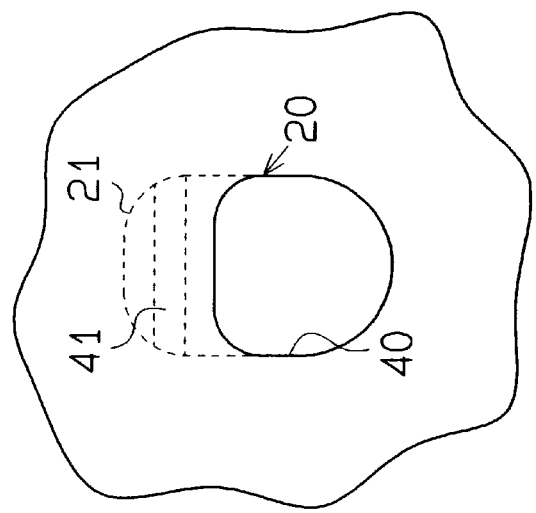
FIG. 15 is a partial plan view illustrating a tail area of a diaper for animals according to another embodiment.
Figure 13:
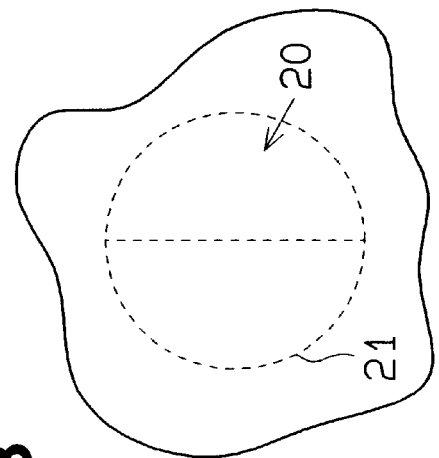
FIG. 13 is a partial plan view illustrating a tail area of a diaper for animals according to another embodiment.
Figure 14:
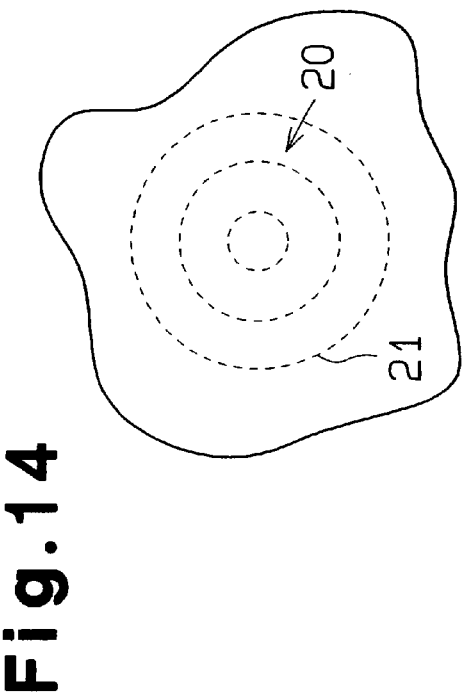
FIG. 14 is a partial plan view illustrating a tail area of a diaper for animals according to another embodiment.

A second embodiment of the present invention will now be described with reference to FIGS. 8 to 10. The differences from the first embodiment will mainly be discussed below, and like or the same reference numerals are given to those components that are like or the same as the corresponding components of the first embodiment.

Figure 8:
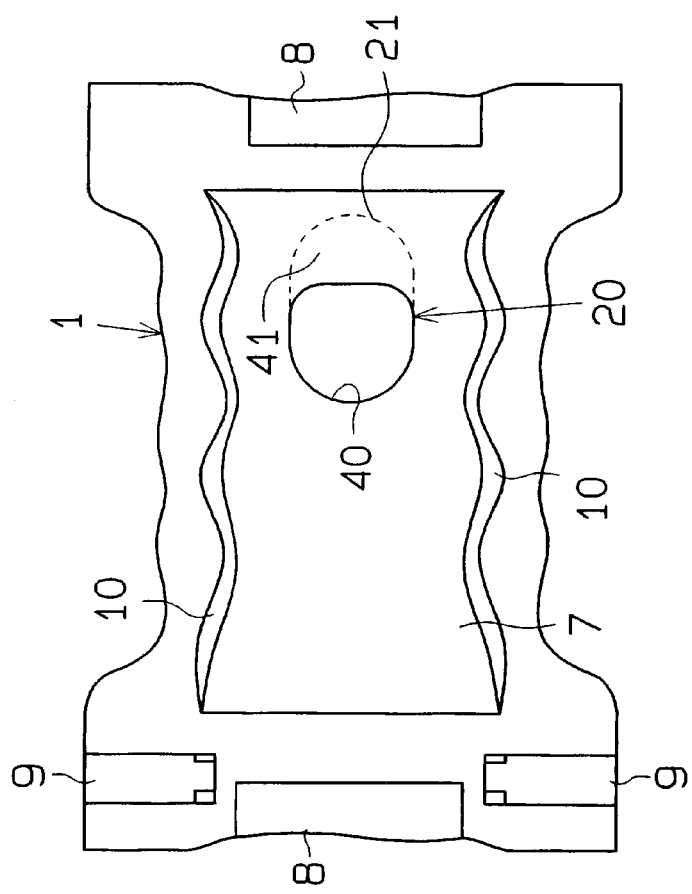
FIG. 8 is a plan view illustrating a diaper for animals according to a second embodiment of the present invention.
Figure 11:
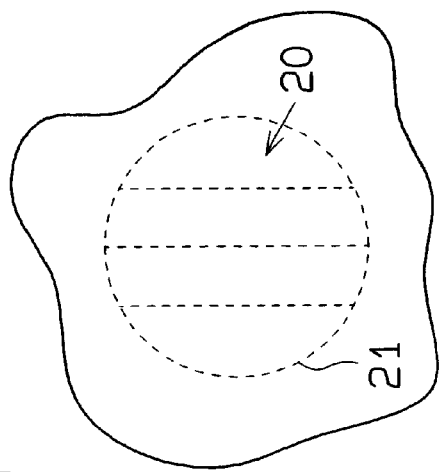
FIG. 11 is a partial plan view illustrating a tail area of a diaper for animals according to another embodiment.
Figure 12:
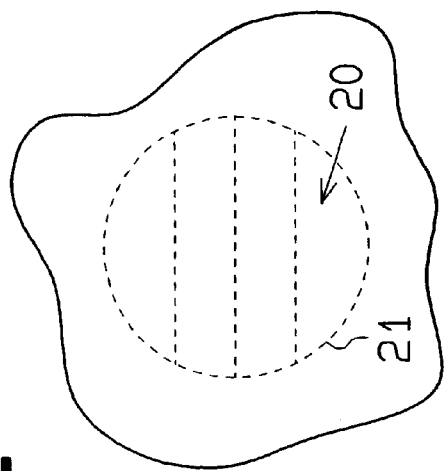
FIG. 12 is a partial plan view illustrating a tail area of a diaper for animals according to another embodiment.

As shown in FIG. 8, the non-absorbent tail area 20 is different from that in the first embodiment. The tail area 20 of the second embodiment includes a substantially semi-circular tail hole 40 and a substantially semi-circular removable portion 41, or tail hole expansion area, that is defined by a weakness groove 21. The hole 40 and the groove 21 are simultaneously formed by a die on the tail area 20.

The periphery of the hole 40 is sealed preferably by heat sealing such that the absorbent 3 does not come out. As in the first embodiment, parts of the sheets 6 and 7 that correspond to the portion 41 are preferably sealed to each other by heat sealing. The sealed area is slightly larger than the removable portion 41. Thus, if the removable portion 41 is removed along the groove 21, the absorbent 3 does come out. If the removable portion 41 is removed, the hole 40 is enlarged to form an oblong tail hole.

When applied on an animal, such as a dog, the tail is passed through the hole 40. If the diaper 1 of the second embodiment is used for receiving only fluid waste of the dog, the removable portion 41 is removed along the weakened groove 21. This elongates the hole as shown FIGS. 9 and 10. When excreting solid waste, a dog's tail is erect as shown in FIG. 10. At this time, the diaper 1 of the second embodiment exposes the anus of the dog to the outside. Therefore, the dog discharges the solid waste to the outside.

Although only two embodiments or the present invention have been described so far, it should be apparent to those skilled in the art that the present invention may be embodied in many other specific forms without departing from the spirit or scope of the invention. Particularly, it should be understood that the invention may be embodied in the following forms.

As illustrated by two-dot chain lines in FIG. 4, the parts of the paper sheets 2 and the permeable sheet 7 corresponding to the non-absorbent tail area 20 may be removed. This results in the tail area 20 being constituted by only a part of the waterproof sheet 6. This facilitates removal of the tail area 20.

In the first embodiment, the weakness grooves 21 may be formed differently for dividing the tail area 20 into different shapes as shown in FIGS. 11 to 14.

In the second embodiment, the portion 41 may be divided by a plurality of weakness grooves 21. The size and shape of the areas divided by the grooves 21 may be arbitrarily determined.

In the first embodiment, the permeable sheet 7 may initially be placed on the table 30. In this case, one of the absorbent paper sheet 2 is placed on the sheet 7. Next, the masking plate 31 is held above the paper sheet 2. Then the absorbent polymer 5 is sprayed on the sheet 2 through the plate 31. Thereafter, the pulp 4 is sprayed on the sheet 2 through the plate 31. The polymer 5 and the pulp 4 form the absorbent 3. Subsequently, the other paper sheet 2 and the water proof sheet 6 are placed on the absorbent 3. Part of the sheets 6 and 7 corresponding to the non-absorbent tail area 20 are adhered to each other by heat sealing. Also, the periphery of the sheet 7 is adhered to the sheet 6 by heat sealing.

The absorbent 3 may be initially sprayed on one of the absorbent paper sheets 2, and the other paper sheet 2 is then placed thereon. Thereafter, the absorbent 3, which is sandwiched between the sheets 2, is placed between the water-proof sheet 6 and the permeable sheet 7.

In the preceding embodiments, the diaper 1 is applied to a dog. However, the diaper 1 may be applied on animals other than dogs, such as cats.

In the non-absorbent tail area 20, the waterproof sheet 6 and the permeable sheet 7 may be directly adhered to each other without placing the absorbent paper sheets 2 therebetween. This construction further reduces the manufacturing cost.

In the embodiments of FIGS. 2, 8 and 11 to 15, perforated holes may be formed instead of the weakness grooves 21.

Adhesive may be used to seal the sheets of the diaper to one another instead of heat sealing them.

Therefore, the present examples and embodiments are to be considered as illustrative and not restrictive and the invention is not to be limited to the details given herein, but may be modified within the scope and equivalence of the appended claims.

What is claimed is:

1. A diaper for animals comprising:
   an inner permeable sheet;
   an outer water-proof sheet;
   an absorbent material located between the permeable sheet and the water-proof sheet;
   a tail area defined by a line of weakness in the water-proof sheet, the tail area being located at a place on the diaper that corresponds to the location of an animal's tail when the diaper is worn by an animal, wherein a hole may be manually formed in the water-proof sheet for accommodating the tail of an animal by manually separating the water-proof sheet along the line of weakness.

2. The diaper according to claim 1, wherein the tail area is sealed around its periphery to the inner permeable sheet to prevent absorbent material from being exposed if the tail area is separated along the lines of weakness.

3. The diaper according to claim 1, wherein the absorbent material is isolated from the tail area by a seal that extends about the tail area.

4. The diaper according to claim 1, wherein the tail area has a plurality of lines of weakness that divide the tail area into a plurality of removable segments.

5. A diaper for an animal having a tail comprising:
   an inner permeable sheet;
   an outer water-proof sheet;
   an absorbent material located between the permeable sheet and the water-proof sheet;
   a tail hole formed in the diaper for accommodating the tail;
   a tail hole expansion area defined by a line of weakness in the water-proof sheet, the tail hole expansion area being located adjacent to the tail hole, wherein the tail hole may be manually enlarged in the water-proof sheet by manually separating the water-proof sheet along the line of weakness in the tail hole expansion area.

6. The diaper according to claim 5, wherein the tail hole expansion area is sealed along its periphery to the inner permeable sheet to prevent absorbent material from being exposed if the tail hole expansion area is separated along the lines of weakness.

7. The diaper according to claim 5, wherein the absorbent material is isolated from the tail hole expansion area by a seal that extends about the tail hole expansion area.

8. The diaper according to claim 5, wherein the tail hole expansion area has a plurality of lines of weakness that divide the tail hole expansion area into a plurality of removable segments.

9. A method of making an animal diaper having:
   an inner permeable sheet;
   an outer water-proof sheet;
   an absorbent material located between the permeable sheet and the water-proof sheet;
   a tail area defined by a line of weakness in the water-proof sheet, the tail area being located at a place on the diaper that corresponds to the location of an animal's tail when the diaper is worn by an animal, wherein an opening may be manually formed in the water-proof sheet for accommodating the tail of an animal by manually separating the water-proof sheet along the line of weakness, the method comprising the steps of:
   masking an area of one of the sheets, the masked area including an area corresponding to the tail area;
   distributing a layer of absorbent onto the masked sheet over the mask;
   removing the mask;
   placing the other of the sheets on the absorbent to sandwich the absorbent between the water-proof sheet and the permeable sheet; and
   sealing the water-proof sheet to the permeable sheet at the periphery of the diaper and around the tail area.

10. The method of claim 9, including the step of additionally masking a marginal strip about the periphery of the masked sheet so that absorbent will not be distributed on the marginal strip.

11. The method of claim 9, including the step of forming the lines of weakness and sealing about the tail area by melting selected areas of the water-proof sheet.

12. The method of claim 9, wherein the step of sealing around the tail area includes the step of isolating the absorbent from the tail area such that the absorbent will not be exposed if the water-proof sheet is separated along the lines of weakness.

13. The diaper according to claim 1, wherein the diaper has a lower portion and an upper portion, and the tail area is located in the upper portion.

14. A method for making an animal diaper, comprising the steps of:

masking a first sheet of said diaper to delineate an area corresponding to a tail location of an animal wearing said diaper;

distributing a layer of absorbent onto said first sheet;

unmasking said area, thereby removing said absorbent from said area;

sandwiching said first sheet between a waterproof sheet and a permeable sheet;

sealing said waterproof sheet to said permeable sheet at a periphery of said diaper and around said area; and, without regard to the order of the preceding steps, weakening said area corresponding to said tail location to facilitate creation of an opening in said area for said animal's tail.

15. The method of claim 14, comprising the step of weakening said area prior to said masking step.

16. The method of claim 14, comprising the step of weakening said area subsequent to said unmasking step and prior to said sandwiching step.

17. The method of claim 14, comprising the step of weakening said area subsequent to said sealing step.

* * * * *